(12) United States Patent
Lörsch

(10) Patent No.: US 6,952,910 B1
(45) Date of Patent: Oct. 11, 2005

(54) GAS FILLED BODIES

(76) Inventor: Johannes Lörsch, An der Bleiche 49, D-47638 Straelen (DE)

( * ) Notice: Subject to any disclaimer, the term of this patent is extended or adjusted under 35 U.S.C. 154(b) by 0 days.

(21) Appl. No.: 10/381,835

(22) PCT Filed: Sep. 27, 2000

(86) PCT No.: PCT/DE00/03371

§ 371 (c)(1),
(2), (4) Date: Mar. 27, 2003

(87) PCT Pub. No.: WO02/26589

PCT Pub. Date: Apr. 4, 2002

(51) Int. Cl.⁷ ............................................. B65B 31/00
(52) U.S. Cl. ................. 53/472; 53/403; 53/79
(58) Field of Search ........................ 53/472, 79, 403, 53/474, 445, 52, 95, 127, 559; 206/522; 156/147, 156/156

(56) References Cited

U.S. PATENT DOCUMENTS

| 3,359,703 | A | * | 12/1967 | Quaadgras | 53/493 |
| 3,389,534 | A | * | 6/1968 | Pendleton | 53/550 |
| 3,575,757 | A | * | 4/1971 | Smith | 156/147 |
| 3,751,875 | A | * | 8/1973 | Membrino | 53/568 |
| 3,817,803 | A | * | 6/1974 | Horsky | 156/85 |
| 3,938,298 | A | * | 2/1976 | Luhman et al. | 53/403 |
| 3,975,885 | A | | 8/1976 | Carlisle | |
| 4,316,566 | A | * | 2/1982 | Arleth et al. | 226/2 |
| 4,674,268 | A | * | 6/1987 | Gavronsky et al. | 53/468 |
| 5,070,675 | A | * | 12/1991 | Chuan-Shiang | 53/79 |
| 5,340,632 | A | * | 8/1994 | Chappuis | 428/71 |
| 5,693,163 | A | * | 12/1997 | Hoover et al. | 156/147 |
| 5,873,215 | A | * | 2/1999 | Aquarius et al. | 53/403 |
| 5,937,614 | A | * | 8/1999 | Watkins et al. | 53/79 |
| 5,942,076 | A | * | 8/1999 | Salerno et al. | 156/359 |
| 6,234,777 | B1 | * | 5/2001 | Sperry et al. | 425/46 |
| 6,410,119 | B1 | * | 6/2002 | De Luca et al. | 428/166 |
| 6,536,183 | B1 | * | 3/2003 | Brown | 53/79 |
| 6,635,145 | B2 | * | 10/2003 | Cooper | 156/441.5 |
| 6,675,557 | B2 | * | 1/2004 | Sperry et al. | 53/237 |

FOREIGN PATENT DOCUMENTS

| DE | 19913408 A | | 10/2000 | |
| EP | 0252467 A | | 1/1988 | |
| EP | 1 022 234 | * | 7/2000 | B65D 81/05 |
| EP | 1022234 A | | 7/2000 | |

* cited by examiner

Primary Examiner—Rinaldi I. Rada
Assistant Examiner—Paul Durand
(74) Attorney, Agent, or Firm—Joan Pennington

(57) ABSTRACT

In a plastic tube (1) for the production of gas filled bodies, with two superimposed sheets, connected in a gas tight manner to each other along a first longitudinal edge thereof, the upper sheet (2) and the lower sheet (3) are welded together in the transverse direction along gas tight welded seams (5a,5b), arranged in pairs at a separation from each other, in order to form inflatable pockets (7), which seams extend from the first longitudinal edge (4) to a point at a predetermined separation from the opposing second longitudinal edge (6). The pockets each present, between the upper sheet and the lower sheet, a gas filling opening (8) which is accessible from the second longitudinal edge. Also proposed are a method for the production of gas filled bodies using such plastic tubes and a device for carrying out said method.

9 Claims, 5 Drawing Sheets

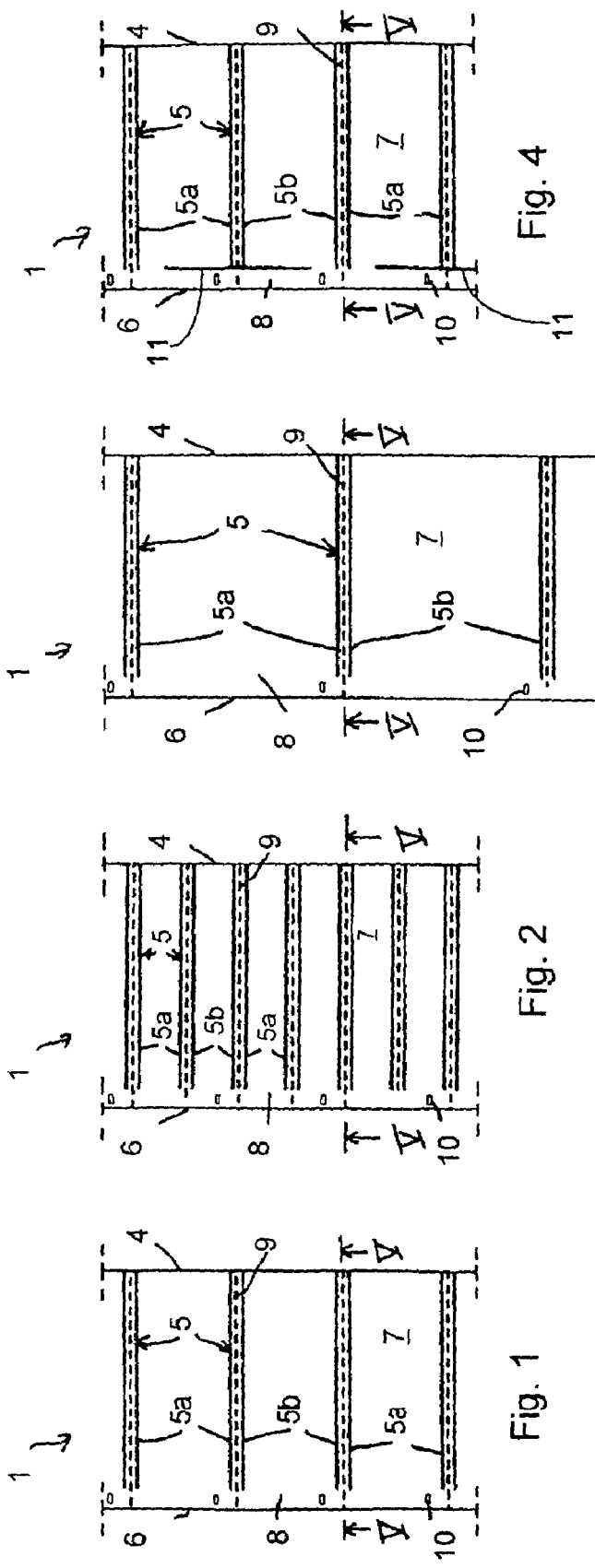

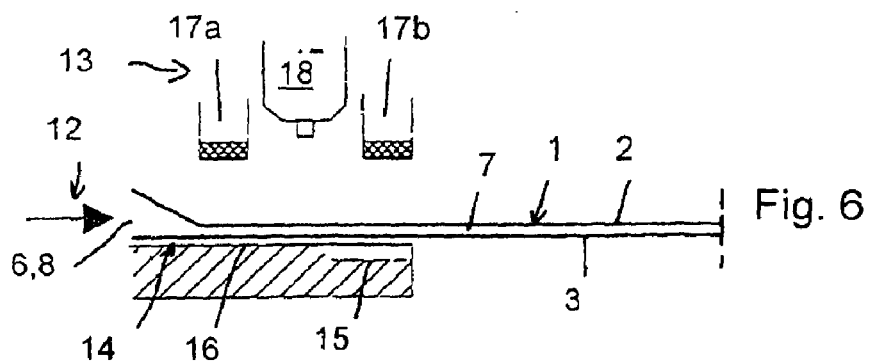
Fig. 6
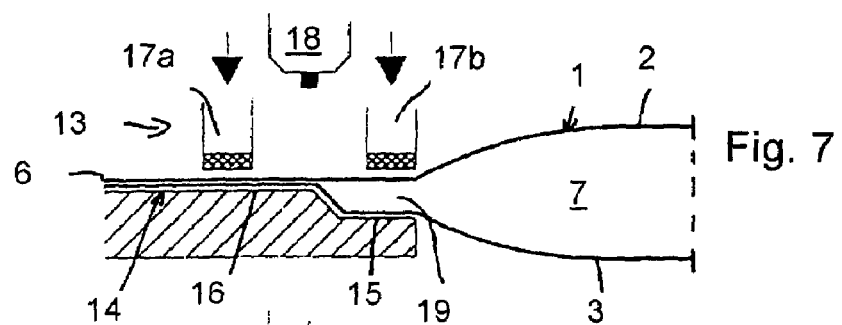
Fig. 7
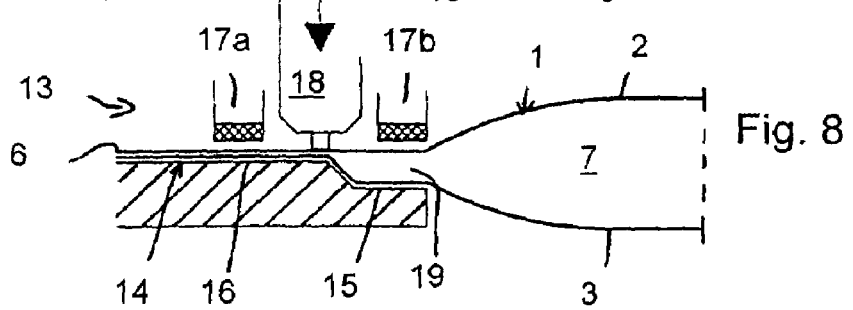
Fig. 8
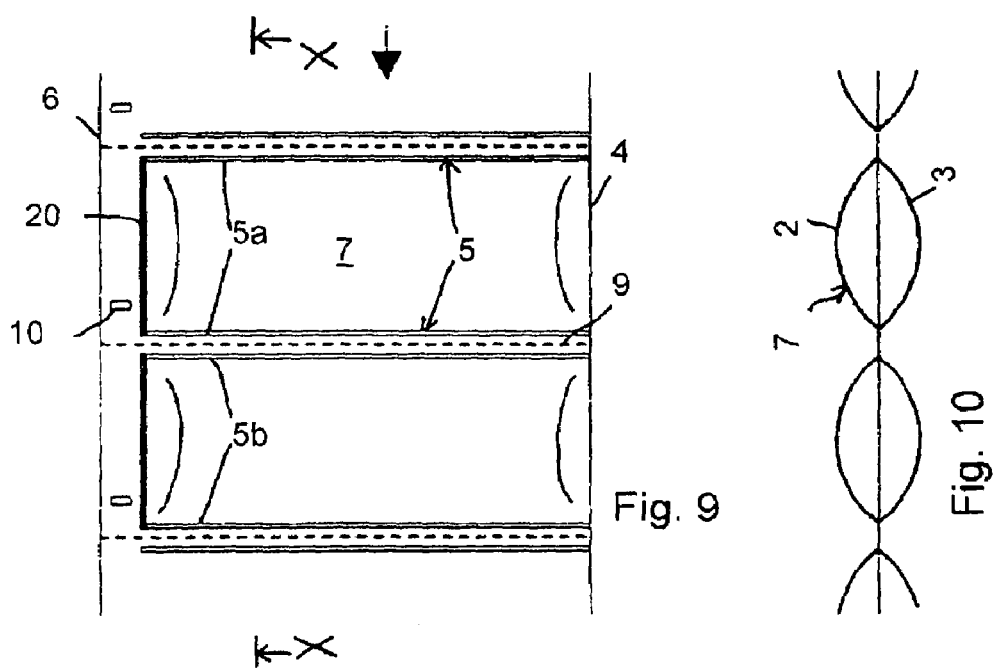
Fig. 9
Fig. 10

A-B   Fig. 13

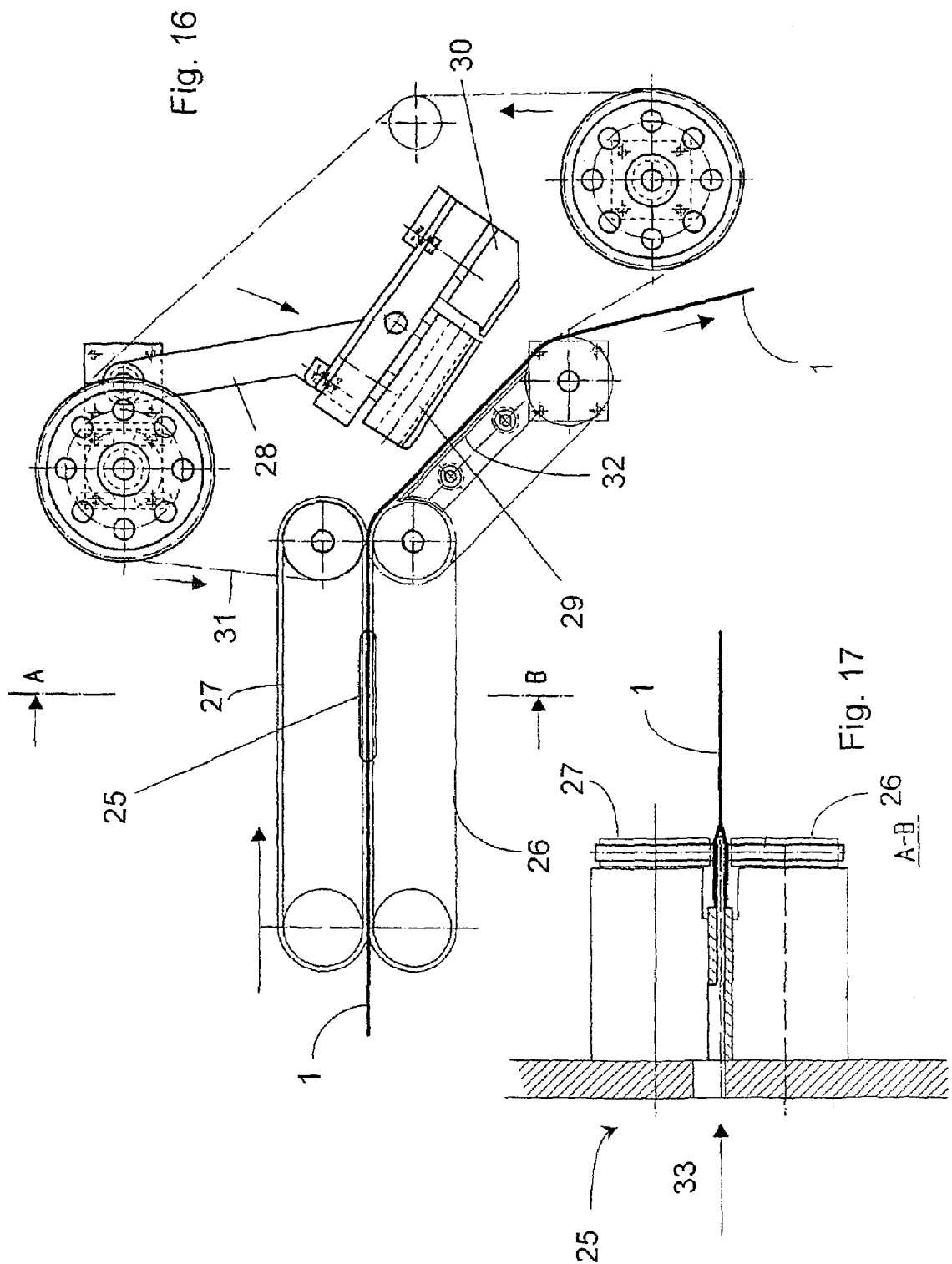

GAS FILLED BODIES

This application is a 371 of PCT/DE00/03371 filed in Germany on Sep. 27, 2000.

FIELD OF THE INVENTION

The invention relates to a plastic tube for the production of gas filled bodies, with two superimposed sheets, connected in a gas tight manner to each other along a first of their longitudinal edges, wherein the upper sheet and the lower sheet are welded together in the transverse direction along gas tight welded seams, arranged in pairs at a separation from each other, in order to form inflatable pockets, which seams extend from the first longitudinal edge to a point at a predetermined separation from the opposing second longitudinal edge, where an intermediate space is present between each pair of welded seams. The invention further relates to a method for the production of gas filled bodies using such plastic tube and to a device for carrying out said method.

DESCRIPTION OF THE RELATED ART

Gas filled bodies are used for padding objects in transport boxes to prevent shaking or damaging of the transported products. The filling bodies are filled with gas only immediately before use, and they can therefore be delivered to the packagers or consumers and stored by them with a great savings in space requirement. An additional advantage of the filling bodies consists in that they do not increase the packaging weight because of their light weight; and, after use, the filling bodies can be recycled in a pure sorting form as they are usually made of only one plastic material.

Gas filled bodies are used for padding objects in transport boxes to prevent shaking or damaging of the transported products. The filling bodies are filled with gas only immediately before use, and they can therefore be delivered to the packagers or consumers and stored by them with a great savings in space requirement. An additional advantage of the filling bodies consists in that they do not increase the packaging weight because of their light weight; and, after use, the filling bodies can be recycled in a pure sorting form as they are usually made of only one plastic material.

It is known to manufacture filling bodies from a plastic sheet which is inflated as a tube, then wound as a flat tube onto a roller, and transported to the consumer. At the consumer's facility this flat tube is then fed from the roller as a flat material to a machine which perforates the tube in a transverse direction. With gripping devices, for example vacuum gripping devices, the two flat sides of the tube are then pulled apart so that air can penetrate into the tube. In this air filled state the upper sheet and the lower sheet are then connected in an air tight manner to each other, resulting in the formation of air filled bodies or pouches. At the perforation, the filling bodies are torn from the tube, and led to their respective use. The drawback here is that the machine which is required at the consumer's facility is technically relatively complex and cost intensive. In particular, the perforation and welding tools are close to each other, which makes it difficult to replace them. Thus, the use of plastic sheets of different widths and the formation of filling bodies which have different lengths in the longitudinal direction of the tube involve considerable expenditure because the weld seam length and/or their separation from each other have to be adapted in each case.

From DE 34 42 396 A1, a plastic tube of the type mentioned at the beginning is known, where the plastic tube which is closed on all sides is filled using a type of injection device, and where the opening made by the injection device is then welded. The known design requires very involved and expensive filling devices because in these devices the small injection openings are sealed from the environment by holding down the film, and they have to be exposed to relatively high pressures to reach a satisfactory filling rate, whereby generally a compressor is necessary to generate pressurized air.

Based on the above, the invention is based on the problem of producing gas filled bodies which can by filled by means of simple and flexible devices.

SUMMARY OF THE INVENTION

According to the invention, this problem is solved in the case of a plastic tube of the type mentioned at the beginning by the fact that the pockets are designed in each case with at least a partial section of their second longitudinal edge open, to form a gas filling opening.

Furthermore, the invention is solved according to the invention by a method in which a plastic tube which has been prefabricated according to the invention is readied, gas is consecutively blown into each pocket through the gas filling opening which is formed as described above, and then the gas filling opening of the gas filled pocket is welded gas tight.

A device for carrying out the method according to the invention presents a holder for a tube supply, a transport device for the transport of the tube through the device, as well as a welding device, and it is characterized in that a gas filling device is arranged at the second longitudinal edge of the continuous tube and it presents a nozzle by means of which gas can be blown into the gas filling opening of the pocket, and in that the welding device is also arranged at the second longitudinal edge and it presents a welding tool by means of which the gas filling opening of a pocket can be sealed gas tight with a welded seam which runs in the longitudinal direction of the tube.

By using a plastic tube according to the invention, the work which must be carried out at the consumer's facility is considerably reduced, whereby a plastic tube which has been prefabricated according to the invention is not substantially more expensive than the tubes which are already known because plastic tubes according to the invention can be manufactured in several parallel webs in the context of the prefabrication, for example with doubled width. The only remaining step is then to blow gas laterally into the filling bodies, and to close the lateral gas filling opening with a welded seam in the longitudinal direction of the tube. As a result, the device of machine for the manufacture of gas filled bodies, on the one hand, can be designed more simply, and, on the other hand, it can be easily adapted to the manufacture of filling bodies of different sizes. The separation of the upper sheet and the lower sheet by means of a tool is not absolutely required. This separation is achieved by inflation with gas. Because the gas filling is carried out from a longitudinal edge, and also because only one welding device needs to be provided, which is also arranged at this longitudinal edge and which needs only to be designed for the welding of the gas filling opening, plastic tubes of different width can be processed without any problem. No work needs to be done over the width of the plastic film, so that the corresponding device parts, such as, for example, perforation knives and corresponding welding tools, also are not present, and therefore they do not have to be adapted or exchanged. The dimensions of the filling bodies in the longitudinal direction of the tube also can be changed without any problem because either always only one gas filling opening of identical width needs to be closed or the corresponding welding tool can be exchanged in a very simple manner. The welding tool is accessible without problem because no additional tools are present in the immediate proximity. A device according to the invention is therefore more cost advantageous and also more maintenance friendly than known devices. One only needs to produce a welded seam, and always at the same place, so that variations in the quality of the welded seam are reduced and a stable high level of welding quality is guaranteed.

In the context of the invention, each pocket at the second longitudinal edge can be completely opened or partially closed air tight by a welded seam in the longitudinal direction. The part which remains free in each case forms the gas filling opening. For example, it is conceivable that this welded seam on the side of the second longitudinal edge extend from a welded seam pair on both sides to a predetermined separation from the next pair of welded seams, wherein a gas filling opening is formed in each case by this separation.

In an advantageous embodiment, a perforation is arranged in the intermediate space of each pair of welded seams, which allows a simple separation of the filled pouch. Alternately, the separation of the pouches can also be carried out by a cutting knife or a cutting edge which is provided at the device for filling the plastic tubes.

Advantageously, in the space between the second longitudinal edge and the adjacent ends of the transversely running welded seams, markings for indicating the position of these welded seams are arranged. With these measures, one avoids having to use an expensive synchronization which otherwise would be required. The markings are preferably formed as punched out sections, although they could also be printed in a manner which is also preferred.

Furthermore, markings with coded information on the constitution of the plastic tubes can by applied by punching or printing. In this manner, a device for filling the plastic tubes according to the invention can determine the type of sheet (for example, sheet thickness, material, dimensions) which has just been inserted and thus adapt various operating parameters such as, for example, welding time and temperature, filling quantity or filling time, transport speed and transport distances, etc.

In an additional advantageous variant of the invention, punched out sections are provided in the area of the perforation, at least in proximity to the longitudinal edges, to allow the engagement of a pin for the continued transport of the tube. The plastic tube can thus be led in a simple manner through the device.

The method according to the invention becomes particularly simple if air is blown into the pockets, for example as pressurized air or by means of a bellows.

In the case of a device according to the invention, it is preferred that the nozzle can be introduced into the gas filling opening of each pocket, where it is particularly preferred not to provide a seal between the nozzle and the edge of the filling opening. This results in more cost reductions, although it is not possible to achieve high filling pressures due to leakages.

In an advantageous embodiment of the invention, the gas filling device presents an expansion device by means of which the upper sheet and the lower sheet are lifted away from each other in the area of the gas filling opening, whereby air or another filling gas can be filled into the gas filling opening of each pocket through the channel which is thus formed. The expansion device can here be in the form of a thin plate which engages between the upper sheet and the lower sheet, where the thickness of the plate increases in the longitudinal direction, whereby the upper sheet and the lower sheet are lifted away from each other during a transport movement. In the area of the largest plate thickness, on the front side of the plate, which is turned toward the interior of the pocket, an air outlet is located through which the pockets are filled. With continued transport, the thickness of the plate decreases so that the upper sheet and the bottom sheet again are one on top of the other, assuming that there is a corresponding counter pressure from the outside.

The above described codings on the tube are preferably detected by corresponding detection devices, and the device is controlled accordingly.

In an advantageous embodiment of the invention, the welding device is also provided with a placement surface, on which the tube can be placed in the area of the gas filling opening of the pocket and which presents an upper section which is turned toward the second longitudinal edge, and a lower section which is turned toward the pocket, and it is provided with two clamps in transverse direction on both sides of the welding tool, where one of the clamps is arranged above the upper section and the other one is arranged above the lower section, and where the clamps, in their working position are applied against the upper sheet and they press this sheet and the lower sheet together on the upper section, and where the clamp which is arranged above the lower section leaves a slit between the upper sheet and the lower sheet. The upper sheet is thus pressed, reliably and completely, against the lower sheet in the welding area because the gas can escape in the slit.

In a preferred refinement of the invention, the transport device presents magnet or pneumatic actuators which in each case engage in the intermediate space between the welded seams of a pair of welded seams on the tube. These actuators can be part of a clasp which pulls the plastic sheet over a spindle from the roller.

In another also preferred alternative embodiment, the invention presents transport device pins which can engage in punched out section of the tube.

In one embodiment, the device according to the invention can transport the tube in cycles, that is the filling and the welding process in each case occur when the tube is at rest; then the tube is further transported by one pocket length.

In this embodiment it is also conceivable in each case to simultaneously fill or weld several pockets, preferably two pockets next to each other, for the purpose of increasing the operating speed.

In an alternative embodiment of the invention one provides for the continuous transport of the tube, and for continuous filling with gas by means of a gas filling device of the type described above, and then for welding together with a continuously operating welding device, preferably a heating bath.

BRIEF DESCRIPTION OF THE DRAWINGS

The invention is further explained below with reference to the drawing of an example. In the drawing:

FIG. 1 shows a top view of a first embodiment of a plastic tube according to the invention;

FIG. 2 shows a top view of a second embodiment of a plastic tube according to the invention;

FIG. 3 shows a top view of a third embodiment of a plastic tube according to the invention;

FIG. 4 shows a top view of a fourth embodiment of a plastic tube according to the invention;

FIG. 5 shows a cross sectional view of a plastic tube according to the invention along line IV—IV in FIGS. 1–4;

FIGS. 6–8 each show a schematic partial view of a device according to the invention with the method process according to the invention;

FIG. 9 shows a cross sectional view of a plastic tube according to the invention with gas filled bodies and welded gas filling openings;

FIG. 10 shows a cross sectional view along line X—X in FIG. 9;

FIGS. 12a, 12b, 12c, 13, and 14 show representations of plastic tubes according to the invention similar to FIGS. 1–5, except tubes with additional coding punched out sections;

FIG. 16 shows a schematic cross section of a device according to the invention with continuous mode of operation; and FIG. 17 shows a cross sectional representation of the gas filling device from FIG. 16 along cross section line A–B.

DETAILED DESCRIPTION OF THE PREFERRED EMBODIMENTS

Figure 11:
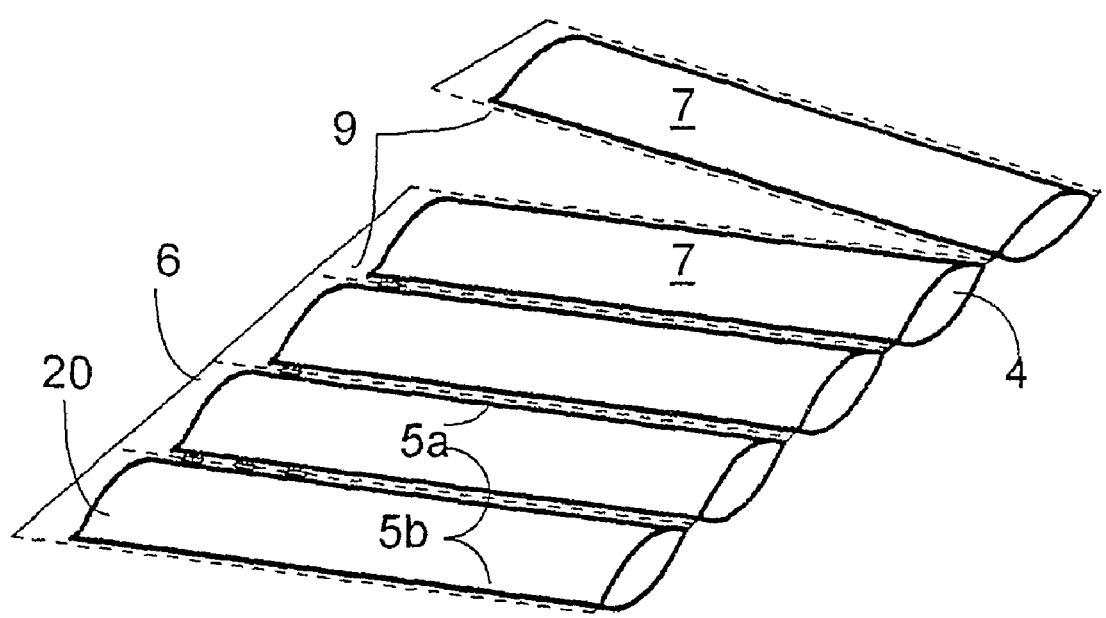
FIG. 11 shows a perspective view of the gas filled body from FIG. 9 with additional coding marks.
Figure 12A:
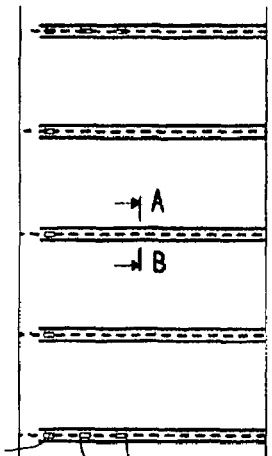
Figure 12B:
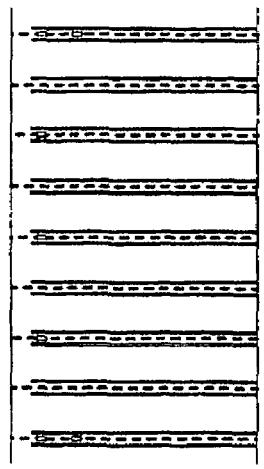
Figure 12C:
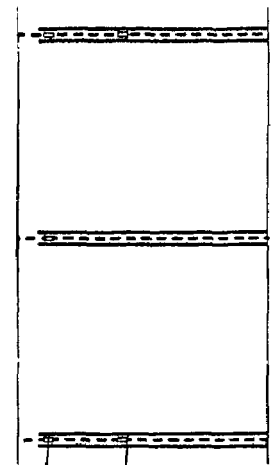

The embodiment examples of plastic tubes according to the invention 1 shown in the figures are manufactured from a half tube, that is from a longitudinal plastic sheet, which is folded along its longitudinal axis, so that one half of the plastic sheet as upper sheet 2 lies on top of the other half as bottom sheet 3. The fold edge 4 forms a first longitudinal edge, at which the upper sheet 2 is connected gas tight to the lower sheet 3.

From this first longitudinal edge 4, pairs 5 of welded seams extend in a transverse direction to a predetermined distance from the opposite open longitudinal edge 6 (FIG. 5). The pairs 5 of welded seams are arranged in the longitudinal tube direction at a predetermined separation from each other, and they allow connection of the upper sheet 2 and the lower sheet 3 to one another in a gas tight manner. The first gas tight longitudinal edge 4 and the, in each case opposing, welding seams 5a, 5b of adjacent pairs 5 of welded seams together form so called pockets 7. On the side of the second longitudinal edge 6, the pockets 7 are open, resulting in the formation of a gas filling opening 8 for each pocket 7, through which each pocket or each filling body 7 can be inflated with gas.

Between the welded seams 5a, 5b of each pair 5 of welded seams, an intermediate space is arranged in each case, in which a perforation seam 9 runs from the first longitudinal edge 4 to the second longitudinal edge 6.

At the second longitudinal edge 6, markings 10 are provided at predetermined separations in the longitudinal direction of the tube, which are shown in the embodiment examples as punched out sections. As shown in FIGS. 1–3, the separation between the pairs 5 of welded seams from the plastic tube 1 to the plastic tube 1 can be variable to manufacture pockets or filling bodies 7 having different lengths. The markings 10 show the position of the pairs 5 of welded seam, where, as shown, for example, in FIG. 2, a marking 10 is not necessary for each pair 5 of welded seams because, with an even separation between the pairs of welded seams 5, for each plastic tube 1, the position of pairs of welded seams 5, lying between two markings 10 can be determined without any problem.

As shown in FIGS. 12a, 12b, 12c, 13, and 14, the pockets can present additional punched out sections 21, by means of which properties of the pocket material used can be coded. As a result, the filling device can automatically adapt operating parameters such as welding times, filling quantities or filling times or advance distances when the tube material is inserted. The punched out sections are preferably arranged at a predetermined distance from the second longitudinal edge of the pockets, where they can be determined by appropriately arranged detection devices of the filling device (for example fork light barriers). To be able to make do with as few markings or detectors as possible, the properties of the pockets can be coded in a binary code. The punched out sections can be located in the entire area between the pairs of welded seams.

Figure 15:
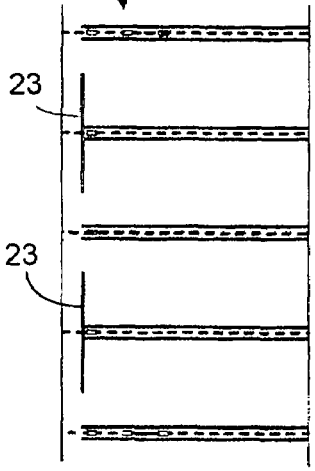
FIG. 15 shows a top view of a plastic tube according to an additional embodiment of the invention.
Figure 14:
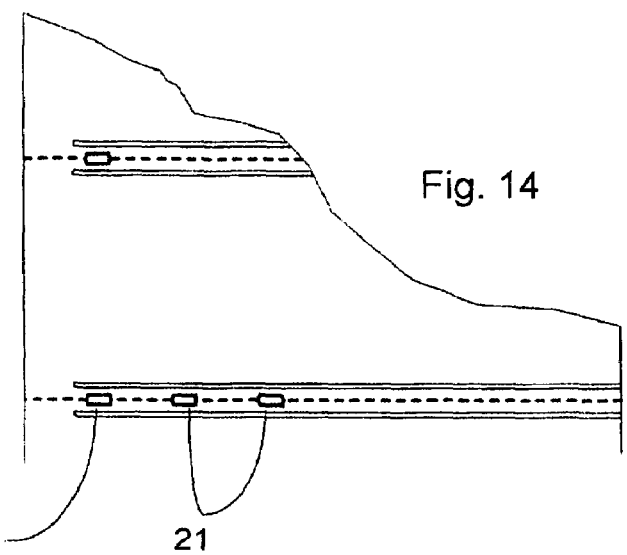

FIG. 15 represents an embodiment of a plastic tube according to the invention in which the second longitudinal edge is partially prewelded. In this embodiment it is possible to simultaneously fill and simultaneously weld two pockets located next to each other, where the filling and welding tools, because of the prewelds 23, must not be formed broad as in the above described embodiments. In this manner, the filling speed can be increased by up to 100%.

In the embodiment shown in FIG. 4, the open side of the pockets 7 is also in the uninflated state, that is in the context of the prefabrication of a plastic tube according to the invention 1, it is partially closed gas tight by a longitudinal welded seam 11. The longitudinal welded seams 11 extend in the shown example from each second pair 5 of welded seams to each of the adjacent pairs 5 of welded seams and they end at a predetermined separation from them. The unwelded area of the pocket side which is turned toward the second longitudinal edge 6 then forms the gas filling opening 8. This has the advantage that in each case the welding device must only be designed, independently of the separation of the pairs 5 of welded seams, that is the length of the pockets 7, for one constant welded seam length because the length of the gas filling opening 8 can be kept constant.

The method and one embodiment of the device according to the invention are described below with reference to FIGS. 6–8. A plastic tube 1 which has been prefabricated according to the invention is wound as a flat tube onto a roller and it is pulled by the transport device, for example by means of magnet or pneumatic actuators which in each case engage between the welded seams 5a, 5b of a pair of welded seams 5 on the tube 1, over a spindle from the roller and is transported in cycles to a gas filling device 12 and to a welding device 13. In the shown example, the second longitudinal edge 6 of the plastic tube 1, that is its area which contains the gas filling opening 8, is transported from the transport device to a placement surface 14, over which the gas filling device 12 and the welding device 13 are arranged. Here the markings 10 indicate the transversely running welded seams 5a, 5b, so that a synchronization of the machine is not required. By means of a nozzle at the open second longitudinal edge 6, the gas filling device 12 blows, in this case air, between the upper sheet 2 and the lower sheet 3, and through the appropriate gas or air filling opening 8 into the associated pocket 7.

The placement surface 14 presents a lower section 15 which is turned toward the pocket 7 and a higher section 16 which is turned away from the pocket 7. The lower sheet 3 of an inflated pocket 7 is applied against the contour of the placement surface 14, as shown in FIGS. 7 and 8.

The welding device 13 presents two clamps 17a, 17b which are arranged transversely with respect to the longitudinal direction of the tube at a separation from each other. The clamp 17a is arranged over the higher section 16 of the placement 14, while the other clamp 17b is located over the lower section 15. Between the clamps 17a, 17b, a welding tool 18 is positioned. From a starting position in which they do not contact the upper sheet 2 (FIG. 6), the clamps 17a,b can be moved into an operational position, in which both clamps 17a, 17b are applied against the upper sheet 2 (FIG. 7). In this operational position, the upper sheet 2 and the lower sheet 3 are pressed against each other on the higher section 16 of the placement surface 14. Both clamps 17a, 17b are arranged at the same level, as a result of which the clamp 17b which is positioned above the lower section 15 of the placement surface 14 leaves a slit 19 between the upper sheet 2 against which it is applied and the bottom sheet 3 which is applied against the lower section 15 of the placement surface 14. As a result, a smooth or horizontal course of the upper sheet 2 between the clamps 17a, 17b is achieved because the air present in this free space 19 between the upper sheet 2 and the lower sheet 3 can escape over the lower section 15 of the placement surface 14.

After the upper sheet 2 is pressed through the clamps 17 onto the upper section 16 of the placement surface 14 upon the lower sheet 3, the welding tool 18 is also moved downward, that is toward the plastic tube, to air tight weld the upper sheet 2 to the lower sheet 3 in the area of the air filling opening 8 (FIG. 8). The side of the pocket 7 or of the newly finished filling body which is turned toward the second longitudinal edge 6 of the tube 1, like the other sides of the filling body 7, is now closed in a gas tight manner, as shown in FIG. 9. The inflated filling bodies 7 can now be separated, if needed, at the perforation seam 9 from the tube 1 (FIG. 11).

FIG. 16 represents a continuously operating embodiment of the device according to the invention. The plastic tube which has been prefabricated according to the invention 1 is fed from a roller or a similar part (not shown). In a first transport area, the sheet is led by two drive belts 26, 27 past a gas filling device 25, which is shown in detail in FIG. 17. The gas filling device separates the upper sheet and the lower sheet of the plastic tube which has been prefabricated, and it blows in air through the opening which has thus formed. Outside the gas filling device, the upper sheet and the lower sheet are held together by the drive belts 26, 27 so that the air which has been blown in does not escape. In a second transport area, the prefabricated plastic tube is continuously welded at its second longitudinal edge. For this purpose, the plastic tube is led on its front side by a heated band 31 made of Teflon coated metal. This heated band is heated by an electrically heated welding rocker 28 in a welding area. The welding rocker 28 in FIG. 16 is shown in a raised state. The welding rocker 28 is only in this state when the installation is not in use; during operation, the welding rocker with its heated band 29 made of brass is applied against the metal band 31, which transfers the heat in a predetermined area to the plastic tube. To prevent heating of the heated band along its entire periphery and to guarantee an even welding quality, a cooling device (operating, for example, with Peltier elements) is provided after the welding rocker 28, seen in the direction of conveyance, by means of which the heat is removed relatively quickly from the heated band. On the backside, the plastic tube is guided by a drive belt 32. The belts 26, 27 and 31, 32, shown in FIG. 16 are respectively axially shifted with respect to each other in the plane of the drawing. Furthermore, the first transport extension and the second transport extension are slanted with respect to each other by a predetermined angle, for example 45°. This arrangement leads to a more breakdown-free run of the plastic tube. As a result of the shrinkage which occurs during the welding process, the sheet material could in fact be pulled out of the first transport area with completely straight guidance which leads to problems. This is largely avoided with an angled arrangement. The continuously operating embodiment described above, compared to a device which operates in cycles with similar components, can produce a tendency for a higher output of filling bodies because transport cycles can be omitted in the continuously operating device. In contrast to the device which works in cycles, with the continuously operating device one does not need to wait after the welding process and before further transport until the welded seam is sufficiently cooled.

What is claimed is:

1. A method for the manufacture of gas filled bodies comprising the steps of:
   a) readying of a prefabricated plastic tube (1) with two superimposed sheets being connected in a gas tight manner to each other along a first longitudinal edge (4), an upper sheet (2) and a lower sheet (3) of said two superimposed sheets welded together in a transverse direction along gas tight welded seams (5a, 5b), said gas tight welded seams (5a, 5b) being arranged in pairs (5) at a separation from each other to form inflatable pockets (7), said welded seams extending from said first longitudinal edge (4) to a point at a predetermined separation from an opposing second longitudinal edge (B), a perforation (9) being located in an intermediate space between said welded seams (5a, 5b) of each pair (5) of said welded seams, each of said pockets (7) having at least a partial open section adjacent said second longitudinal edge (6) to form a gas filling opening (8);
   b) providing a gas filling device (25) for successive blowing a filling gas into each said pocket (7) through said gas filling opening (8),
   c) providing a welding device (13) for gas tight welding of said gas filling opening (B) of the filled pocket (7), and
   d) continuously moving said tube (1), said tube being continuously moved first past said gas filling device (25) here said filling gas is blown into each said successive pocket through said gas filling opening (8); holding together said upper and lower sheets by drive belts (26, 27) to prevent the filling gas from escaping each said pocket; then continuously moving said tube past said welding device (28) where said gas filling opening (8) of each said successive pocket (7) is gas tight welded.

2. A device for carrying out a method for the manufacture of gas filled bodies comprising:
   a holder for holding a supply of a tube,
   a transport device for transporting the tube through the device,
   a gas filing device (25) disposed proximate a second longitudinal edge (6) of the tube (1) for blowing a filling gas into a gas filling opening (8) defined by a partial open section adjacent said second longitudinal edge (6) of each successive pocket (7) of said tube (1), and
   said transport device including drive belts (26, 27) for holding closed the gas filling opening outside the gas filling device (25) for preventing the filling gas from escaping each said successive pocket (7);

a welding device (28) disposed proximate the second longitudinal edge (6) said welding device (28) including a welding tool (29) for welding closed the gas filling opening (8) of each successive pocket (7) in a gas tight manner with a welded seam (20) extending in a longitudinal direction of the tube; and said transport device for continuously moving the tube (1), said tube being moved first past said gas filling device (25) and then past said welding device (28).

3. A device according to claim 2 wherein in said gas filling device presents an expansion device for lifting apart the upper sheet and the lower sheet (3,4) in the area of the gas filling opening to define a channel, whereby said filling gas is blown into the gas filling opening (8) of each pocket (7) through the channel.

4. A device according to claim 2 wherein air is blown into the gas filling opening, and wherein no seal is provided between a nozzle and an edge of the gas filling opening (8).

5. A device according to claim 2 includes detectors for detecting markings (10,21) on the sheet (2), whereby one or more of a machine speed, a gas filling quantity, and a welding time are controlled.

6. A device according to claim 2 includes a first transport area wherein the tube is continuously moved past the gas filling device (25), and a second transport area with the welding device wherein the tube is led in the area of the second longitudinal edge least one side by a heated band (31), said heated band (31) being heated in a welding area for welding the tube.

7. A device according to claim 6 wherein the first transport area and the second transport area together form a relative angle of approximately 45°.

8. A device for carrying out a method for the manufacture of gas filled bodies comprising:

a holder for holding a supply of a tube, a transport device for transporting the tube through the device, a gas filling device (25) disposed proximate a second longitudinal edge (6) of the tube (1) for blowing a filling gas into a gas filling opening (8) defined by a partial open section adjacent said second longitudinal edge (6) of each successive pocket (7) of said tube (1), and a welding device (28) disposed proximate the second longitudinal edge (6), said welding device (28) including a welding tool (29) for welding closed the gas filling opening (8) of each successive pocket (7) in a gas tight manner with a welded seam (20) extending in a longitudinal direction of the tube;

said transport device for continuously moving the tube (1), said tube being moved first past said gas filling device (25) and then past said welding device (28), and said welding device (28) having a placement surface (14) for supporting the tube (1) in an area of the gas filling opening (8) of each said successive pocket (7) and said placement surface including a higher section (16) facing toward the second longitudinal edge (6) and a lower section (15) facing toward the packet (7), and a pair of clamps (17a, 17b), a respective one of said pair of claims extending in a transverse direction on a respective side of the welding tool (29), one clamp (17a) of said pair of clamps being disposed above the higher section (16) and an other one clamp (17b) being disposed above the lower section (15), and wherein said pair of clamps (17a, 17b) in a working position contact an upper sheet (2) of said tube (1) and press said sheet (2) and a lower sheet (3) of tube (1) together on the higher section (16), and a slit (19) between the upper sheet (2) and the lower sheet (3) being defined by said other one clamp (17b) of said pair of claims disposed above the lower section (15).

9. A plastic tube for the manufacture of gas filled bodies comprising:

two superimposed sheets being connected in a gas tight manner to each other along a first longitudinal edge (4), an upper sheet (2) and a lower sheet (3) of said two superimposed sheets being welded together in a transverse direction along gas tight welded seams (5a, 5b), said gas tight welded seams (5a, 5b) being arranged in pairs (5) at a separation from each other to form inflatable pockets (7), said gas tight welded seams (5a, 5b) extending from said first longitudinal edge (4) to a point at a predetermined separation from an opposing second longitudinal edge (6), a perforation (9) being located in an intermediate space between said welded seams (5a,5b) of each pair (5) of said welded seams, each of said pockets (7) having at least a partial open section adjacent said second longitudinal edge (6), to form a gas filling opening (8), and a plurality of punched out sections (10, 21) being located on said perforations (9) forming a coding to indicate a position of said gas tight welded seams (5a, 5b) and selected properties of a pocket material including one or more of a sheet thickness; a sheet width; a welding time and a welding temperature.

* * * * *